United States Patent [19]

Boeckmann

[11] Patent Number: 4,680,783
[45] Date of Patent: Jul. 14, 1987

[54] TELEPHONE SECURITY VIOLATION DETECTION DEVICE

[75] Inventor: Eduard F. B. Boeckmann, Huntsville, Ala.

[73] Assignee: GTE Communication Systems, Inc., Northlake, Ill.

[21] Appl. No.: 808,978

[22] Filed: Dec. 16, 1985

[51] Int. Cl.⁴ .............................................. H04M 1/24
[52] U.S. Cl. ......................................... 379/6; 379/7; 379/387
[58] Field of Search ....... 179/81 E, 175.1 R, 175.2 R, 179/175.2 C, 175.1 A, 175.2 A, 175.21, 175.25, 175.2 D, 175.3 F, 1.5 R, 175.3 R, 81 R, 175.2 B; 379/387, 35, 32, 7, 6

[56] References Cited

U.S. PATENT DOCUMENTS

| 4,186,282 | 1/1980 | Ellson | 179/175.3 R |
| 4,197,435 | 4/1980 | Jackson et al. | 179/175.3 R |
| 4,218,592 | 8/1980 | Steinbergs et al. | 179/81 E |
| 4,413,163 | 11/1983 | Basini | 179/175.3 R |
| 4,634,813 | 1/1987 | Hensley | 379/24 |

Primary Examiner—James L. Dwyer
Assistant Examiner—C. Champion
Attorney, Agent, or Firm—Robert J. Black

[57] ABSTRACT

A method and system for detection of authorized connections to a telephone line where such connections are for the purposes of intercepting voice or data messages. The original or base line impedance would be measured by the system in response to the entry of a special code. The base line is stored in memory and used for subsequent impedance comparisons.

4 Claims, 2 Drawing Figures

4,680,783

TELEPHONE SECURITY VIOLATION DETECTION DEVICE

BACKGROUND OF THE INVENTION (1) Technical Field

The present invention relates to the detection of eavesdropping devices connected to a local telephone line at the subscriber's terminal and more particularly, to devices of the line bridging type where a small change in line impedance occurs because of the bridging device.

(2) Background Art

Many types of eavesdropping devices have been developed for both legal and illegal monitoring of telephone conversations. Such devices include microphone pickups and transmitting devices ("bugs"), and radio frequency devices which pick up electromagnetic radiation from a subscriber's terminal. A different but very common type of eavesdropping equipment includes a simple line "tap" where a bridging amplifier is placed across the telephone line and the output thereof is utilized to intercept conversations on the telephone line.

Assuming that a subscriber's terminal is periodically inspected for "bugs" and that it is well shielded to prevent radio frequency emissions, the next most likely way for eavesdropping to occur is to utilize the line tapping technique. This tapping technique will cause a small or perhaps even a large change in line impedance depending upon how the tapping is accomplished.

Accordingly it is the object of this invention to show how a line tapping device can be detected on the line by the subscriber's telephone terminal equipped with suitable microprocessor controlled electronics.

SUMMARY OF THE INVENTION

The present invention consists of a method and a conceptual device which detects a change in telephone line impedance as an indication of line "tapping" or security violations of the particular telephone line and telephone subscriber's instrument.

The proposed method consists of generating a test tone in the telephone subscriber's instrument and then using the signal amplitude generated to determine if a small change in source impedance has occurred during the course of the telephone operation.

The source impedance is defined to be the impedance of the telephone instrument or terminal and the local telephone line it is connected to at the time of measurement. During the time that the test tone is generated under control of an associated microcomputer in the system, the microcomputer also connects and disconnects a shunting resistance element. Thus two measurements are made, one with the shunt connected and the second without the shunt connected. The resulting two measurements allow the computation of the equivalent source impedance of the system in terms of its absolute value.

In the system as proposed two methods of operation are possible. The first method is to continuously sample the impedance to see if any change has occurred even during the course of the conversation taking place. In this method, the tone generation and switching of the shunt resistor can take place in a very short time such a 200 milliseconds. This time depends on the settling time and response time of the system. The second proposed method would be to check the impedance on commanad of the user only at the start and end of the call.

The original installation would require an examination of the line to insure that no preexisting taps exist. Then the original or base line impedance would be measured by the system in response to the entry of a special code known only to security personnel. In response to the insertion of such codes the base line impedance would be stored in the computer memory for use in subsequent impedance comparisons. A typical sequence of events during a system security check would then be as follows:

1. Generate a steady tone with the associated shunt not included in the circuit.
2. Measure the voltage level on the line (signal RMS value).
3. Switch in the shunt to the circuit.
4. Measure the voltage level (signal RMS value) again.
5. Compute the equivalent source impedance based on data stored in the microcomputer.
6. Compare the computation results to the base line value.
7. If a violation is detected, sound an alarm signal.
8. If no violation is detected, sound an OK or line clear signal.

DESCRIPTION OF THE PREFERRED EMBODIMENT

Referring first to the block diagram of FIG. 1, it should be noted that the circuitry has been shown only in block diagram form in as much as the individual details of the circuitry of each of the elements included therein can assume several different forms all of which would be well known to those skilled in the art, it only being required that they perform the functions set forth hereinafter. With reference to the telephone circuitry which is also shown in block form, the circuit details do not generally effect the design of the invention.

Figure 1:
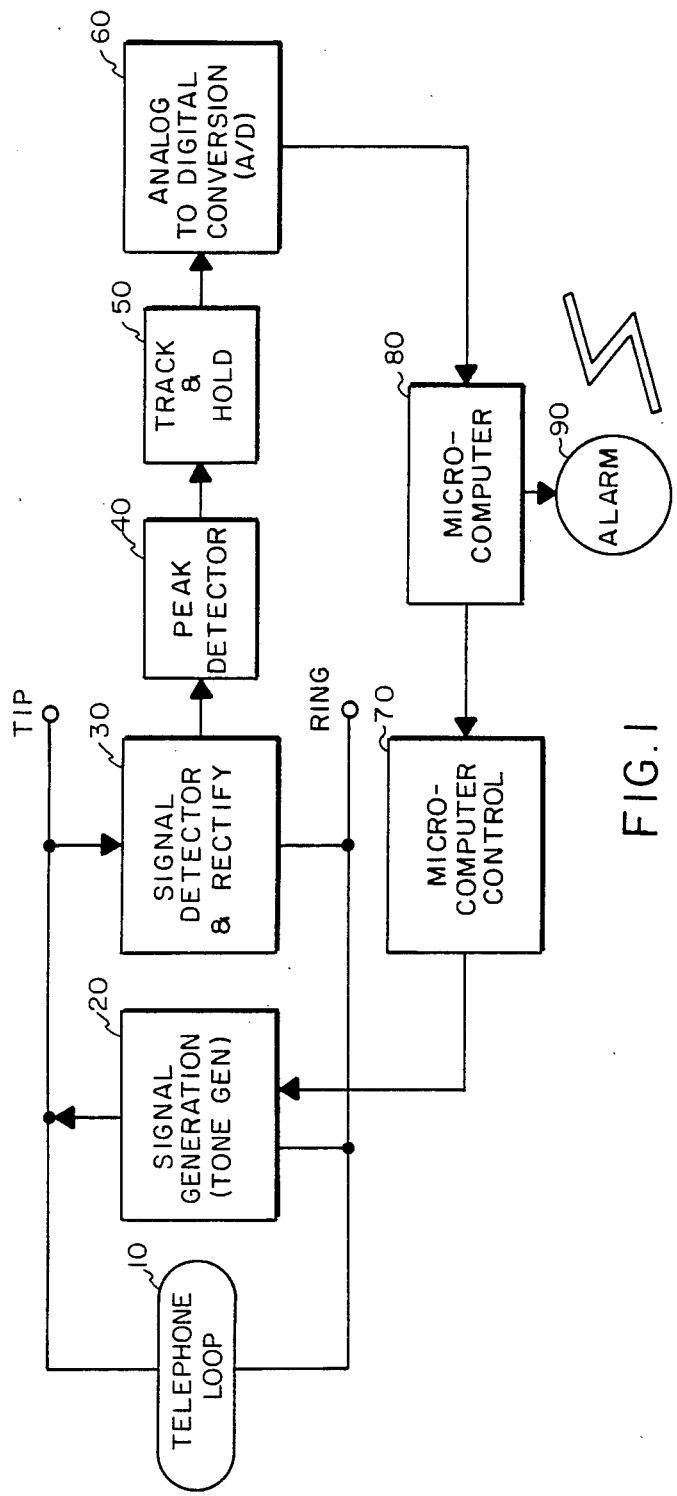
FIG. 1 is a conceptual system block diagram of a telephone security violation detection system in accordance with the present invention.

As seen in FIG. 1, a system tone generator 20 controlled by the associated system microcomputer 70, is used to generate the required signals for an impedance measurement. This signal generator will be the same tone generator normally employed in connection with many telephones for generation of dual tone multifrequency signals as used in so called tone dialing. As can be seen in FIG. 1, a signal generator 20 is connected to the telephone loop 10.

As signal detector and associated rectifying circuit 30, also connected to telephone loop 10, is used to lock on the precise frequency of the generated tone emanating from signal generator 20; converting the resultant signal to a full wave rectified wave form. This signal is then processed through a peak detector 40 and then a track and hold operational amplifier 50 produce a DC level which is an analog of the original AC RMS signal value.

The analog signal developed as outlined above is now converted into digital form by an analog-to-digital conversion system 60 that communicates directly with the system microcomputer 80 on command. The microcomputer 80 allows a time delay between steps in the measurement sequence for settling times necessary before data is converted to digital form and stored in the microcomputer memory.

Once a measurement sequence has been completed which includes voltage measurements with and without the shunt resistance switched in, the data is used to compute the source impedance in a comparison to the base line value which is then executed within the microcomputer. If a lower than normal impedance is detected, an alarm signal will be sounded under control of the system microcomputer. If a normal condition exists the "OK" signal would be generated.

Figure 2:
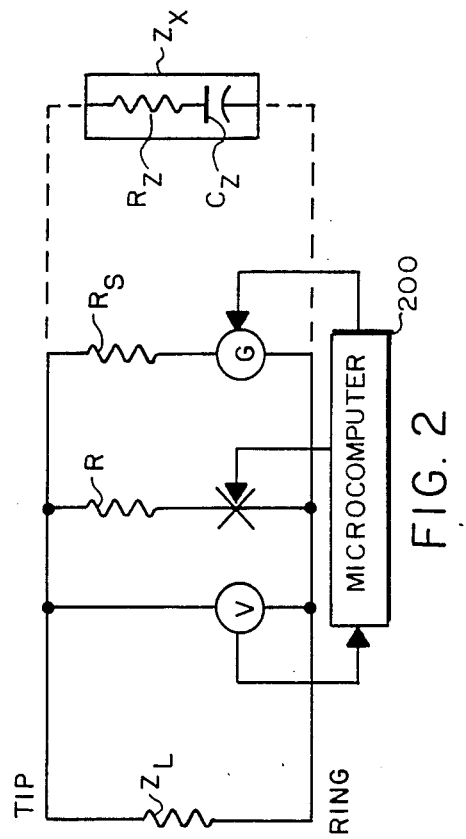
FIG. 2 is a schematic circuit diagram of an impedance measurement equivalent circuit in accordance with the present invention.

Referring now to FIG. 2, the equivalent circuit of the impedance measurement is shown. It will be obvious to those skilled in the art that such a circuit and the measurements that can be made are an unknown bridging impedance ZX having a resistive component RZ and a capacitive component CZ can be detected, if it appears in parallel with the system impedance RS and the loop impedance ZL, with the ability to switch the shunt R in and out of the circuit under the control of microcomputer 200. As shown in FIG. 2 the microcomputer will control the generation of signals at generator G and the resultant voltage measurements can be transmitted from measuring circuitry V to microcomputer 200 for use in the manner outlined above.

It will be obvious to those skilled in the art that numerous modifications may be made to the method and system of the present invention without departing from the spirit of the invention which shall be limited only by the scope of the claims appended hereto.

What is claimed is:

1. The method of detecting unauthorized connections to a telephone line intended to intercept voice or data messages, comprising the steps of:
   measuring the impedance of said telephone line as a first preliminary step;
   storing said measurement as a base line value as a second preliminary step;
   generating a test tone and applying said tone to the telephone line;
   measuring the voltage level on said telephone line;
   connecting a shunt resistance across said telephone line;
   remeasuring the voltage on said line with said shunt resistance connected;
   computing the equivalent source impedance based on said two measuring steps;
   comparing the computed results to said base line value; and
   if the computed results vary from the base line value a predetermined amount giving indication of an unauthorized connection, generating an alarm signal.

2. The method of detecting unauthorized computed results varying from the base line value less than a predetermined amount.

3. The method of detecting unauthorized connections to a telephone line as claimed in claim 2, wherein: all of said steps after said preliminary steps are repeated continuously unless the comparison indicates an unauthorized connection.

4. The method of detecting unauthorized connections to a telephone line as claimed in claim 2, wherein: all of said steps after said preliminary steps, are performed at the beginning and at the conclusion of the use of said telephone line.

* * * * *